Dec. 13, 1960 D. B. MILLER 2,964,374
METER MARK-CARD DEVICE

Filed June 12, 1957 4 Sheets-Sheet 1

INVENTOR
DONALD B. MILLER
BY Brown, Jackson,
Boettcher & Dienner
ATTORNEYS

Dec. 13, 1960  D. B. MILLER  2,964,374
METER MARK-CARD DEVICE
Filed June 12, 1957  4 Sheets-Sheet 2
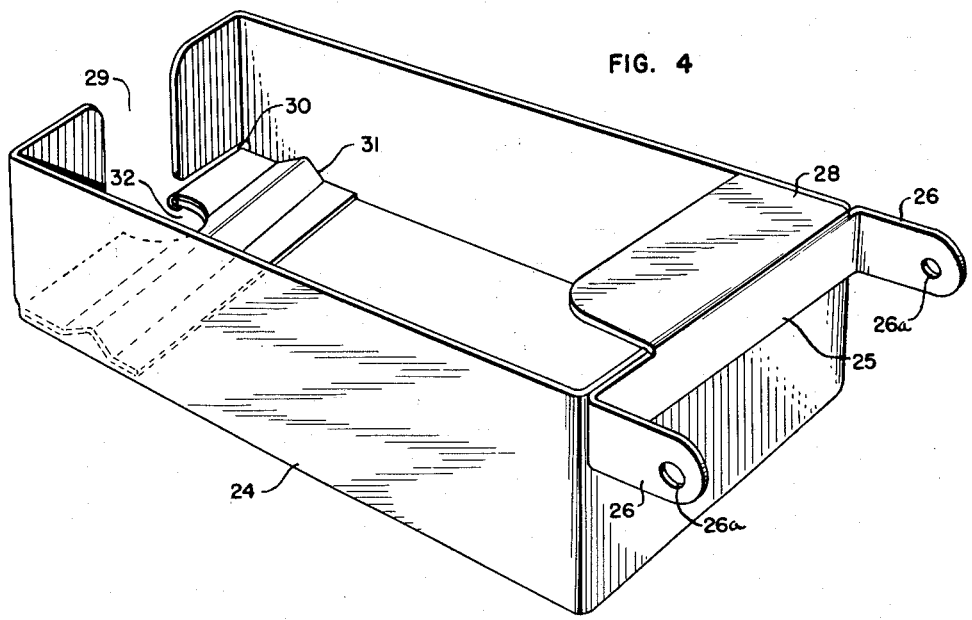
FIG. 4
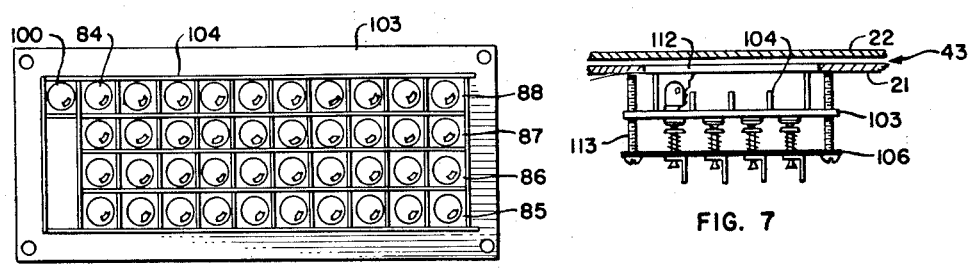
FIG. 6
FIG. 7
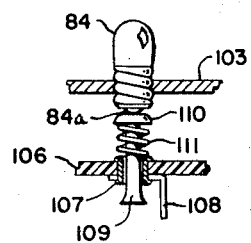
FIG. 8
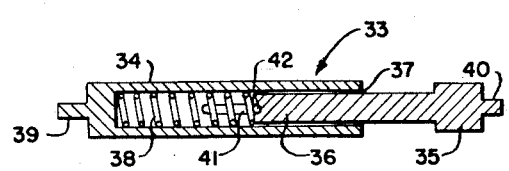
FIG. 9
INVENTOR
DONALD B. MILLER
BY Brown, Jackson,
Boettcher & Dienner
ATTORNEYS Dec. 13, 1960 D. B. MILLER 2,964,374
METER MARK-CARD DEVICE
Filed June 12, 1957 4 Sheets-Sheet 3

INVENTOR
DONALD B. MILLER
BY Brown, Jackson,
Boettcher & Dienner
ATTORNEYS

Dec. 13, 1960    D. B. MILLER    2,964,374
METER MARK-CARD DEVICE
Filed June 12, 1957    4 Sheets-Sheet 4

INVENTOR
DONALD B. MILLER
BY Brown, Jackson,
Boettcher & Dienner
ATTORNEYS

United States Patent Office 2,964,374
Patented Dec. 13, 1960

2,964,374

METER MARK-CARD DEVICE

Donald B. Miller, 212 E. Seminary St., Wheaton, Ill.

Filed June 12, 1957, Ser. No. 665,357

11 Claims. (Cl. 346—17)

This invention relates to a device to be used as an aid in accurately recording, on cards, readings taken of meters such as utilized by various public utilities including water, gas and electric light companies to measure the amount of water, gas or electricity consumed by their customers.

The importance to such companies and their customers of obtaining correct meter readings is of course obvious. However, in an analytical study of meter reading and the problems connected therewith, it was found that the number of requests for check meter reading and actual errors noted were not an inconsequential number and represented a matter of real concern. In a further study to ascertain the cause of such errors, it was found that, although they were due in part to a failure to accurately read the meter, often they were due to a failure on the part of the reader to accurately record what he had read. This has been found to be due to a number of reasons, not the least of which is the distraction afforded the reader at the time of making the reading. Thus quite often the meter is located in a poorly-lighted, out of the way spot so that the reader is required to hold a flashlight directed on the meter while at the same time he must also hold a group of cards, loose or in a receptacle, and try to mark on the appropriate card the reading taken. To add to his difficulties in the interest of speeding up the accounting operation, it has become common for such companies to use in their billing operation, so-called electronic computing machines which are capable of scanning information on a card, compare it with previously stored data, and thereupon compute a charge to be billed the customer. To the end of putting the information in a form which can be scanned by the machine, the reader is provided with cards having several columns of nine or ten spaces, one column being arbitrarily selected to represent units; a second, tens; a third, hundreds; a fourth, thousands and so forth. When columns embodying nine spaces are used, each space is taken to represent a figure 1 through 9, and in the cases when ten space columns are employed, the tenth space represents zero. The idea is, of course, that the meter reading can thus be recorded by marking an appropriate space in each column whereby the machine can interpret the record by sensing the position of the marks. Obviously, therefore, in order for the machines to be useful, it is a condition precedent that the spaces be accurately marked; any great variation, either above, below, or to one side of the space will lead to error on the part of the machine scanning the same. Further in order to correctly mark a reading of say four figures, it is necessary that the reader select from thirty-six or forty possible spaces the four correct ones. Under the conditions above described in which the reading is taken, it will be obvious that the chances for error in marking the wrong space or improperly marking it are great. Further, as the number of places in the reading increases, the chance of error must also go up.

However, not only have there been problems in connection with the proper marking of the meter reading cards, but in actual reading of the meter itself, there is opportunity for error. Probably one of the commonest errors in reading is due at least in part to the type of indicating means employed in such meters. Usually the indicators comprise a plurality of circular dials marked from "0" through "9" each with a rotatably mounted pointer which are drivingly connected to each other through suitable gearing and to the flow measuring mechanism in such a way that the pointer or hand of the "units" dial as it makes a complete revolution moves the pointer of the "tens" dial geared thereto only one tenth of a rotation or 36 degrees. It in turn moves the "hundreds" dial pointer through 36 degrees as it in turn moves through each complete rotation, and so on. Consequently, when the pointer of one dial is positioned in the area of its highest numbers, as at 8 or 9, this means that the pointer on the next succeeding dial will be reaching a full number, or if the pointer is not accurately set, it may be even pointing to or a bit past a full number, but nevertheless to be correctly read, the next lower number must be taken. In a quick reading made necessary by the inability to conveniently manipulate a flashlight, a group of cards and to write with a pencil on one of said cards at the same time, the excuse for not exercising all the care needed presents itself.

Therefore, it is a first and principal object of the present invention to provide a device which will be useful in overcoming the aforesaid difficulties and problems met in accurately reading and recording the information indicated by the dials of a meter, such as aforedescribed.

Obviously, such a device must itself not introduce further problems and should be simple, convenient and practical to use, as well as economical and practical from a manufacturing point of view. These are further important objects of the invention.

Another object of the invention is to provide a device in compact form for supporting a meter card to be marked, and which has means under the control of the reader for indicating which of the spaces on the meter card are to be marked to correspond to the reading taken of the meter dials.

Another object is to provide a meter card support having adjustable means thereon which may be set in accordance with a reading taken of the meter dials, and which in accordance with said adjustment will act on illuminating means contained by said support to selectively limit illumination of the card to areas thereof indicative of the position where the markings are to be applied to the card to correspond to the reading taken of the meter dials.

A further object of the invention is to provide a meter card support containing illuminating means which may be directed onto the meter face and/or used in finding one's way to the meter.

Another object is to provide a meter card support having dials thereon corresponding to the dials on a meter to be read, and further having pointers which may be manually manipulated to positions on the dials of the card support corresponding to the position of the hands on the meter dials.

Still another object is to provide a meter card support having a removable container in which a stack of cards may be stored, said container being adapted to permit one card to be removed at a time from the bottom of the stack and relocated at the top of the stack, said support including a stall for a card to be marked and guide means related to said stall having aligning means corresponding to the columns of spaces on said cards to assist in accurately marking said spaces.

Still another object is to provide a meter card support of the aforesaid construction with illuminating means which may be conveniently energized and focused on a meter to be read.

Still another object is to provide a meter card support having a stall in which a meter card may be located, a face plate disposed over said stall having groups of openings located to overlie the spaces provided on the meter card for marking, scales on said support corresponding to the dials of a meter to be read, pointer means associated therewith which may be adjusted to indicate the positions on the meter dials to which the hands thereof point, the support having means for individually lighting the openings in said face plate, and having control means actuated by adjustment of said pointer means whereby only the openings corresponding to the setting of the pointer means on said scales will be visibly lighted to indicate the spaces on the card to be marked.

Still another object of the invention is to provide means associated with said scales and pointer means on a meter card support of the character referred to above which will serve to warn the reader when a setting is in the 7, 8, 9 zone to exercise care in his reading of the next meter dial.

In this connection, a further object of the invention is to provide such warning means in the form of a signal lamp which will light when the pointers are adjusted into said high number zone.

Many other objects and advantages of the invention will be or will become apparent from the description of a preferred embodiment of the invention which follows. Further, it will be understood that said description is not to be taken in a limiting sense, since many modifications and/or changes will suggest themselves or be suggested from a reading of said description and are to be included within the scope of the invention as defined in the appended claims.

Now referring to the drawings wherein like parts in the several views are indicated by like reference numerals:

Figure 4 is a view of the meter card storage box detached from the device;

Figure 6 is a top plan view showing the arrangement of lamps and means of baffling light therefrom so as to illuminate the individual openings in the top place of the device, and which correspond to the marking spaces on a meter card;

Figure 7 is a fragmented sectional view taken along lines 7—7 of Figure 5 and looking in the direction indicated by the arrows;

Figure 8 is an enlarged fragmentary view illustrating the manner of mounting the individual lamps;

Figure 9 shows an alternate means of detachably connecting the card storage box to the device.

Figure 3:
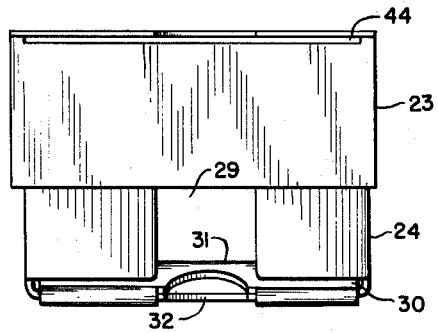
Figure 3 is an end view of the device.
Figure 1:
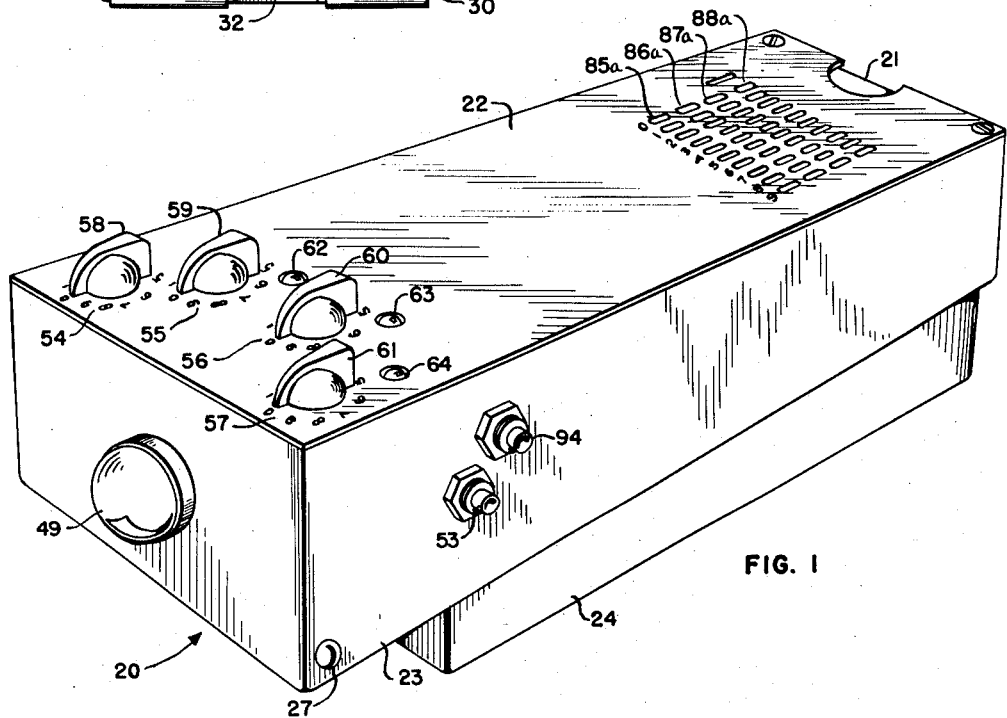
Figure 1 is a perspective view of a device constituting a preferred embodiment of the present invention.
Figure 5:
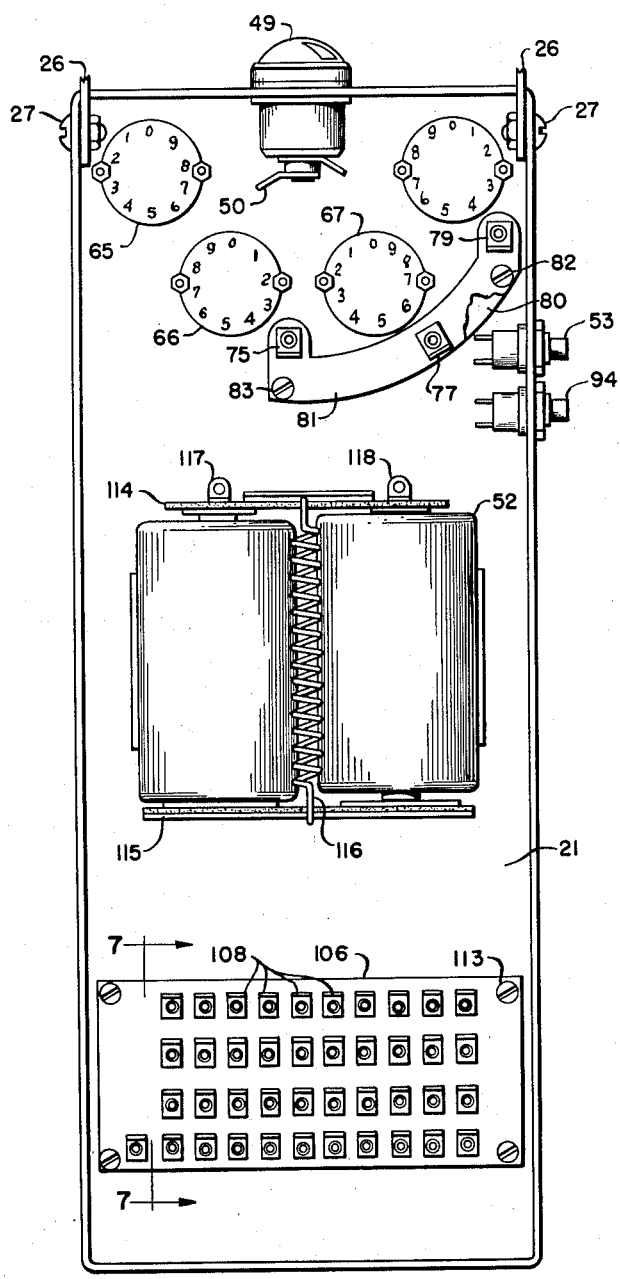
Figure 5 is a view looking into the interior of the device to show the relation of its operative components, the wiring being omitted for ease of illustration.

In Fig. 1, a device according to the present invention comprises a box-like cover member indicated generally at 20 having a mounting panel 21 (see also Figs. 5 and 7) and a removable top-face panel 22 mounted thereover in spaced parallel relation and with depending side walls 23. Detachably connected to the forward wall of said member 20 is a storage container 24 in which the reader's supply of customer cards are contained. Said storage container 24, as shown in Fig. 4, has a member 25 welded or otherwise secured to the forward wall thereof, its opposed ends 26 being forwardly bent into spaced parallel relation to provide a pair of perforated ears which may be detachably connected to the forward end of the cover 21 as by bolts 27 (Figs. 1 and 5). Said member 25 also has a lateral portion 28 which is angled rearwardly to partially cover the exposed open side of the storage container 24 and serves as means for retaining cards stored therein. The rear end wall of said container 24 is divided as at 29, and has a laterally extending slot 30 at the bottom thereof through which cards may be removed from the container one at a time. Desirably the base of said storage container has a plate 31 affixed thereto and which may be of inverted V-shape in section so as to maintain the pile of cards above slot 30 whereby they will not be accidentally discharged. However, the cards may be readily removed one by one from the bottom of the pile by placing one's fingers in space 29 and finger recess 32 so as to catch the opposite sides of the end of the bottom card. Then by bringing it down over the inverted V-sectional plate 31, it can be conveniently withdrawn through discharge slot 30. The card may be subsequently returned to the top of the stack by positioning it beneath lapping portion 28. Space 29 and finger recess 32 also make it more convenient to grasp the stored cards in withdrawing them through the open top of the container 24 or when inserting them through said open top into the container and beneath overlapping portion 28.

Instead of using bolts 27 to detachably connect the storage container 24 to member 20, a latch pin 33 as illustrated in Fig. 9 may be utilized. Such a latch pin, as shown in said view, is formed in two telescoping parts, 34 and 35. Part 35 has a reduced section 36 which slidably fits within the bore 37 of part 34 and against the action of a compression spring 38 located in the end of said bore. The outer ends of the thus mounted parts 34 and 35 are provided with reduced end portions 39 and 40 which can be conveniently inserted into the aligned openings of ears 26 and wall 23 of the cover. This is readily accomplished by temporarily urging part 35 further within the bore of part 34 against the action of spring 38. Once assembled, the action of spring 38 serves to retain said ends 38 and 40 in the aligned connection openings of the cover and storage container and thus hold them in their desired pivotal connected relation. To retain section 36 in bore 37 against the urging of spring 38, one of said members (34 or 35) is provided with an axially disposed limiting slot 41 and the other with a pin 42 riding in said slot whereby the desired amount of retraction and expansion of the latch pin 33 may be obtained for convenient assembling and disassembling of the storage container with its cover while at the same time limiting the extent of said adjustment so as to maintain the parts thereof in assembled relation.

The aforesaid spacing 43 provided between panels 21 and 22 in cover 20 need only be slightly greater than the thickness of a meter reading card C which is to be inserted therein through slot 44 for a reason which will be made clear hereinafter. Face panel 22 may also be suitably recessed as at 45 for convenience in inserting and removing a card C from its receiving stall 43 through slot 44.

Figure 2:
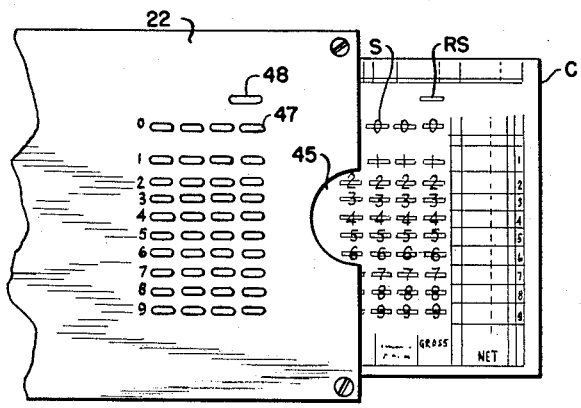
Figure 2 is a fragmentary top plan view of one end of the device showing a meter card partially extended out of its receiving slot or stall.

Referring to Fig. 2, such a card C is provided with four vertical columns of narrow marking spaces S associated with superimposed numerals 0 1 2 3 4 5 6 7 8 9, the column farthest to the right of Fig. 2 representing units; the next column to the left, tens; the third column to the left, hundreds; and the fourth column, thousands and thus are useful to record information indicated by a water, gas, electricity or like measuring meter having four reading dials: one for units, a second for tens, a third for hundreds and a fourth for thousands; it being understood that each column on the card thus corresponds to one of the meter dials and is used by marking the numbered space thereof corresponding to the numeral on the meter dial to which its hand points. Although reference is made above to "units," "tens," "hundreds" and "thousands" it will be understood that the terms are intended to embrace multiples of the particular measure used. Thus in the electricity supplying industry it might be considered to mean watts or kilowatts or even higher values of electrical power. In the gas and water supplying industry it might mean cubic feet, yards, etc., or multiple or fractional parts thereof. Thus the "units" might be hundreds or cubic feet of gas, the "tens," thousands of cubic feet, the "hundreds" ten thousands of cubic feet and the "thousands" hundred thousands thereof. The cards are also preferably provided with a space RS which when marked may be used to indicate that the customer's meter has been read.

Since the marked cards are subsequently fed into an electronic accounting machine which interprets the information marked thereon by the position or height of the mark in the respective column it is obviously important that considerable care be exercised to be sure that only the correct space in each column has been marked. It is also important that the selected space be completely filled in so that it will be significant enough to be recognized as a mark. Obviously the mark may not be disposed either much above or much below the appropriate space else errors will occur when the card is scanned. To guard against such improper markings, face plate 22 is provided with four columns of slots 47 which are similarly arranged and so as to correspond, in position and number, to the spaces S on each card C when it is properly located in stall 43 beneath panel 22 and against suitable stop means (not shown). Face panel 22 is also provided with a slot 48 with which space RS of the card C is aligned when thus properly positioned in stall 43. Face panel 22, thus has a first important function by means of slots 47 and 48 to act as a marking guide or template and so prevent the reader from accidentally extending his mark above, below or to one side of the appropriate space. Furthermore, the edge of the slots 47 and 48 also serve as a guide or means of encouraging the reader to completely fill in the marking space and thus provide a mark easily detected by the machine.

Because of the fact that gas and water meters, in particular, are often located in dimly-lighted, out of the way, hidden spots in the basement of the average consumer, it is proposed to mount in the forward wall of the cover 21, a lamp 49 provided with a reflector and lens such as found in conventional flashlights, and to electrically connect the same to opposite sides of a pair of batteries 52 (see Figs. 5 and 10) through wires 50 and 51. Lead wire 51 contains a switch 53 which may be spring-acted, so that when depressed, it allows current to flow through wire 51 to energize the lamp, and on release of pressure will under the action of the spring immediately assume its normally open position, interrupting the current flow.

As an aid to the reader in accurately interpreting the meter dials, the persent invention is provided with four dials or scales 54, 55, 56 and 57 adjacent the forward end of panel 22. These are each arranged, as shown in Fig. 1, in the form of a circle and numbered 0 through 9 in much the same manner as the dials on the meters of the various customers to be read. Indicator hands or pointers 58, 59, 60 and 61 are rotatably mounted on the face panel 22 in association with said dia's so that the reader may adjust and set them to point to the same number to which the hands of the corresponding meter dials point. Preferably the numerals on each of said scales 54 through 57 are also etched in the panel 22 and filled with phosphorescent material so that they can be readily seen in dimly lit areas.

As previously indicated, one of the more common errors in reading the meter dials occurs when the hand of a preceding dial is in the area of its higher numbers. For example, when the "units" dial hand is directed at numerals 8 or 9 and possibly 7, the "tens" dial hand will be pointing almost to the next full number altho it has not actually reached the same. To guard against a careless and incorrect reading under such circumstances I provide signal lamps 62, 63 and 64 which are located to be visible through suitable openings adjacent scales 55, 56 and 57, respectively. These lamps are so wired that when pointer 58, for example, is set to point to numerals 7, 8 or 9 on "units" scale 54, lamp 62 will be energized, indicating to the reader that when he adjusts pointer 59 relative to the "tens" scale 55, he should recognize that the hand on the corresponding "tens" meter dial, although close to or even coinciding with a whole number, should actually be observed as indicating the next lower number, since the higher number to which it seemingly points has not as yet been actually reached by the meter dial hand. Similarly, adjustments of pointers 59 and 60 to their 7, 8 or 9 position on the "tens" and "hundreds" scale 55 and 56 respectively serve to energize lamp 63 adjacent the "hundreds" scale 56 and lamp 64 adjacent the "thousands" scale 57, respectively to give warning in reading the next higher place meter dial.

Figure 10:
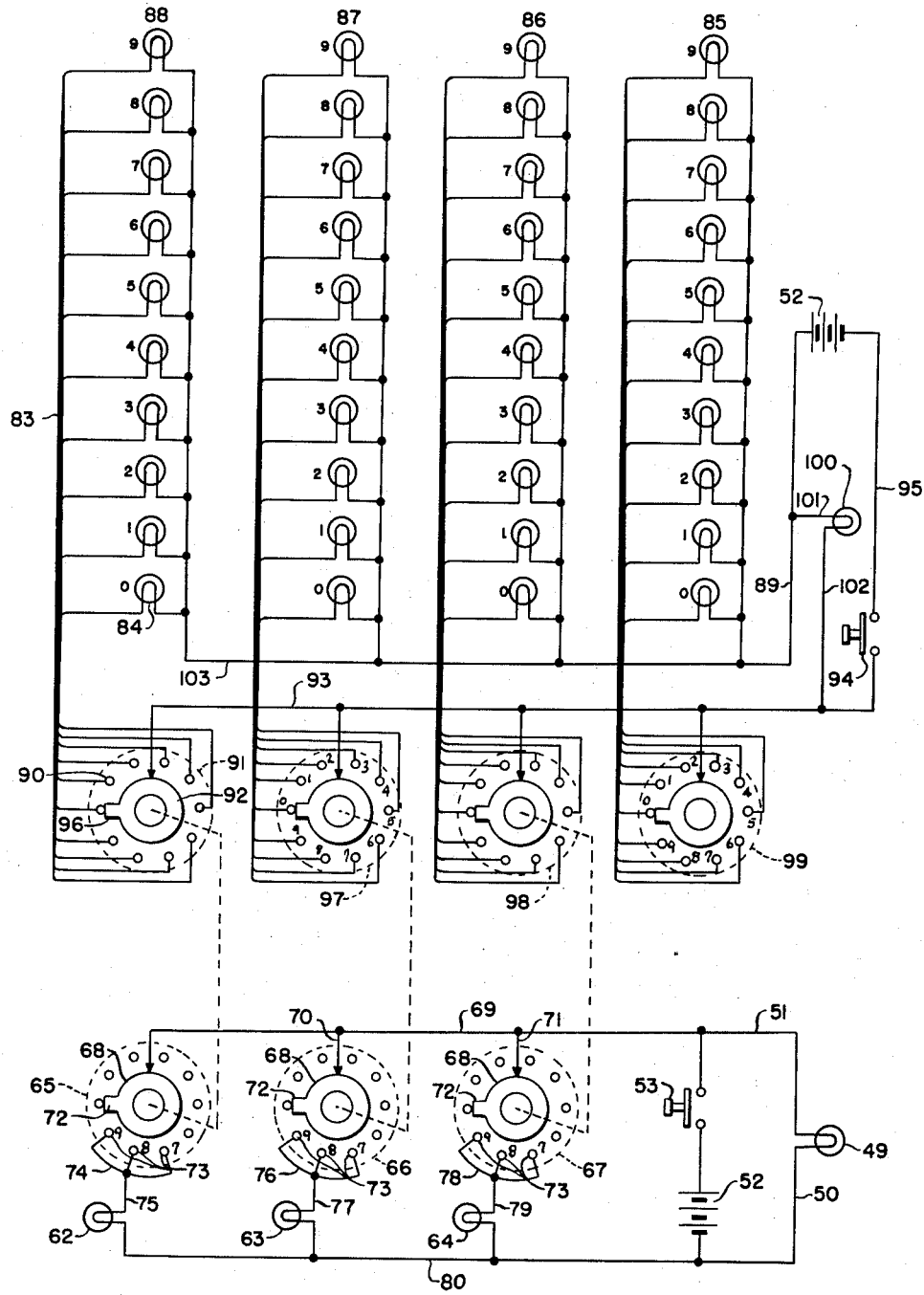
Figure 10 illustrates in diagrammatic form one way in which the device could be operatively wired.

This I accomplish, as seen in Figs. 5 and 10, by means of switches 65, 66 and 67 which are mounted on panel 21 beneath dials 54, 55 and 56, respectively. Said switches, as diagrammatically illustrated in Fig. 10, each comprises an electrically conductive rotatable portion 68 mounted to swing with the rotational adjustment or setting of pointers 58, 59 and 60 with their respective dials. Said portions 68 are electrically connected through wiring 69 and its branches 70 and 71 to wiring 51, and through switch 53 to one side of battery 52. Said rotatable conductive members 68 are each provided with a portion 72 for establishing electrical contact with points 73 of said respective switches which are located to correspond to position of numerals 7, 8 and 9 on scales 54, 55 and 56, respectively. Said three contact points 73 of switch 65 are connected by wiring 74 to terminal connector 75 of lamp 62, the contact points 73 of switch 66 by wiring 76 to terminal connection 77 of lamp 63 and the contact points 73 of switch 67 by wiring 78 to the terminal connection 79 of lamp 64. Lamps 62, 63 and 64 are in turn grounded to a common electrical conducting plate 80 connected to wire 50 and thus to the other side of batteries 52. As shown in Fig. 5, terminal connections 75, 77 and 79 are insulatedly mounted on a supporting plate 81 suspended from panel 21 by screws 82 and 83, supporting plate 80 in which lamps 62, 63 and 64 are threadedly mounted being supported thereby and electrical connection of the terminal connectors with the terminal ends of said lamps being obtained by a construction similar to that illustrated in Figure 8 and hereinafter described more in detail. Therefore, assuming switch 53 is depressed to close the circuit, as to energize lamp 49, adjustment of pointer 58 so that it points to any one of numerals 7, 8 and 9 on scale will also act to rotate projection 72 of switch 62 into electric contact with one of the three contact points 73, to energize lamp 62 as will also adjustment of pointers 59 and 60 to their 7, 8 or 9 positions will serve to energize lamps 63 and 64 respectively. Obviously, since there is no scale of higher value than 57 in the illustrated embodiment, no such warning light is tied in with the adjustment of pointer 61.

Although scales 54, 55, 56 and 57 are shown with their numerals arranged in a circle to simulate conventional meter dials, any other suitable configuration could be utilized. For example, scales might be arranged in lines to parallel the forward side of cover 21, and in which event the pointers might be mounted to move in parallel slots which would thereby permit adjustment or setting relative to the numerals of the respective scales.

One of the important features of the present invention is the arrangement provided by which the marking spaces in the meter cards can be selectively illuminated in accordance with the position of pointers 58—61 on the respective scales 54, 55, 56 and 57 to brighten the slots 47 through which the card C should be marked to correctly indicate the meter dial reading. Although numerous arrangements for such selective lighting of slots 47 could be devised and are intended to be included within the broad scope of the present invention, I have illustrated and will now describe one very satisfactory arrangement. In accomplishing this function, a plurality of miniature lamps 84 are located one beneath each of the slots 47 and 48 in face panel 22 and are individually wired to the batteries in circuits which can be interrupted by switch means also under the control of pointers 58, 59 and 60 and 61. Thus it is contemplated that at each position of adjustment of the pointers a different lamp bulb will be energized to light a slot 47 which has been taken as corresponding to the position on the scale to which said pointer is adjusted. Thus as illustrated in Fig. 6 the lamps 84 have been arranged in four columns. 85 represents a column of lamps aligned beneath the respective column of slots 85a in panel 22 and which are intended to be selectively energized in accordance with the position pointer 61 is adjusted. 86 represents a column of lamps aligned beneath column 86a of slots in panel 23 and which are controlled by pointer 60. 87 represents a column of lamps arranged to coincide with slots 47 in column 87a and which are controlled by pointer 59 while 88 represents a column of lamps aligned beneath the column 88a of slots and which are controlled by the position of pointer 58.

As illustrated diagrammatically in Fig. 10, the ten lamps of column 88 are connected on one side to the batteries 52 by plate 103 and line 89 and have their other side connected by lines 83 to contacts 90 of a switch 91, said contacts 90 being arranged in a circle corresponding to the numerals on scale 54. Said switch 91 has a contact establishing member 92 coaxially mounted with rotatable portion 68 of switch 65 and so as to move therewith as pointer 58 is turned. Said contact establishing member 92 has electrical contact through line 93, to switch 94, which is connected by line 95 to the other side of the batteries 52. Thus when switch 94, disposed externally of the cover 21 and conveniently adjacent switch 53, is depressed, it serves to complete a circuit from one side of thte batteries 52 through line 95, switch 94, line 93, contact making member 92, projection 96 thereof, the contact 90 with which the projection portion 96 thereof engages in accordance with the position at which pointer 58 has been set, the lamp 88 electrically connected with said contact 90 and line 89 to the other side of batteries 52. For example, since pointer 58 (see Fig. 1) is pointing to zero, the projection 96 in Fig. 10 is correspondingly shown as having electrical connection with the contact 90 at the zero position. Therefore when switch 94 is depressed, lamp 84 beneath the zero slot in column 88 will light. The lamps 84 in remaining columns 87, 86 and 85 are similarly connected to battery 52 through plate 103 and line 89 and on their opposite side to the contacts 90 of their respective control switches 97, 98 and 99, through leads 82, 81 and 80 respectively. A lamp 100 is also shown located beneath slot 48, and is connected to lines 101 and 102, in parallel with the lamps of column 85 through 88 so that when switch 94 is depressed, it will also be energized.

Although various mechanical means might be employed for mounting lamps 84 and also lamp 100, I prefer to use the arrangement illustrated in Figs. 6, 7 and 8, which includes a mounting plate 103 having openings therein through which the ends of the lamps extend in threaded connection therewith. To confine illumination of the lamps to their respective slots with which they are aligned, baffle plates 104 are arranged on said mounting plate 103 in criss cross right angular relation to each other, so as to provide in effect 41 stalls, one for each of said lamps in the four columns 85, 86, 87 and 88 and lamp 100. Beneath mounting plate 103, I provide a second mounting plate 106 to which are riveted by means 107 a corresponding number of angled terminal connection members 108, one for each lamp. In each of these hollow rivets 107 are slidably mounted a second rivet 109 each having its head 110 resiliently urged against the base of a respective lamp by a compression spring 111 which is confined between head 110 of said rivets 109 and the flared end of the supporting hollow rivet 107. As seen in Fig. 7, plate 106 is supporting in depending relation from supporting panel 21 beneath opening 112 therein by bolts 113 which pass through provided openings in panel 103, and are threadedly connected to the underside of mounting panel 21 so as to depend therefrom. Thus it will be seen that panel 103 is also simultaneously supported through engagement of rivet 109 with the end of the several lamps. By suitably tightening mounting bolts 113, the top edges of baffle plate 105 may be urged against the underside of panel 21 to hold panel 103 in fixed position while simultaneously insuring a good electrical connection between the lamps 84 through their base 84a, hollow rivet 109, compression spring 111 surrounding it, and hollow rivet 107 to the fastening element 108. Each of the elements 108 are connected by suitable wiring to a respective contact 90 in the switches 91, 97, 98 or 99 as above described, or in the case of lamp 100 to line 101 and plate 103 is connected by wire 89 so as to complete the circuit from the lamps to the batteries 52.

Although one might assume that columns of nine lamps each would suffice, on the assumption that if no slot in a particular column were illuminated, this would in itself be indicative of zero. However, by using a tenth lamp in each column of lamps to designate zero, then if the reader does not see lighted slots in each column, he is at once warned that one of the lamps has burned out and the chances for making an erroneous record are accordingly reduced.

Any suitable means for mounting the batteries on the panel 21 may be utilized. For example, in Fig. 5, suitably insulated resilient members 114 and 115 are shown for engaging the opposite sides of the batteries under the urging of a spring 116, the batteries being connected in series and having terminals 117 and 118 electrically connected thereto by which connection may be made conveniently to the elements of the circuits above described.

To briefly summarize, in the use of the device, it is contemplated that a meter reader will be supplied at the beginning of each work day with a storage box 24 containing a stack of meter cards for the customers whose meters he is to read that particular day or period. This box 24 he assemblies with a cover 21, as by bolts 27 or latch pin 33, in the manner previously described. The cards are preferably so arranged that in turn as he prepares to take a reading of each customer's meter, he may take that particular customer's card from the bottom of the pile through slot 30 and insert it in space 43. When finished he returns the card to the container at the top of the pile. If necessary, in making his way to the meter, the reader can energize lamp 49 by depressing switch 53 and thereby provide himself with sufficient light for safe access to the meter location. He will also use said light to illuminate the meter during actual reading of its dials. Switch 53 is located near the bottom edge of the side wall 23 of the cover 20, so that the device can be conveniently held in one hand while depressing the switch with the thumb of the same hand, leaving his other hand free to manipulate and set the pointers 58, 59, 60 and 61 to correspond to the dial setting on the meter being read. In setting the pointers 58, 59, 60 and 61 so as to correspond to the meter dial hands, lighting of one of lamps 62, 63 and 64 will indicate to him a need to exercise care in setting the next dial. Once the pointers have been set, he will release thumb pressure on switch 53 and depress switch 94 so that the slots in each of columns 85a, 86a, 87a, and 88a which he is to mark will be illuminated, said illumination being obtained in consequence to the setting of pointers 58 through 61. Lamp 100 is also illuminated to indicate a need for marking slot 48. Marking of the card through the illuminated slots 47 and 48 may be accomplished either before or after the reader has left the customer's premises. Because of the fact that the correct marking slots in which the sensing pencil is to be inserted are visibly indicated by means of the selected energization of lamps 84, obviously this may be easily accomplished in the darkened area adjacent to the meter location. Also because the dials 54—57 on the device and their associated pointers 58—61 have been adjusted to correspond to the meter dials there is no problem of faulty memory or of having to mentally transpose the meter reading from numerals to position. Consequently assurance is had that the marks will always be in the right position neither above, nor below, nor to the right or left of the appropriate space on the customer's record card.

Thus it will be apparent that all of the objects, advantages and features of the invention have been described as obtainable in a convenient, satisfactory and practical manner.

Having described my invention, I claim:

1. A device of the character described comprising a support for a card on which a meter reading or the like is to be recorded by position marking, said support having a plurality of scale means adjacent one end thereof provided with graduations to correspond to those on a meter to be read, pointer means for said scale means adjustably mounted on said support so as to be aligned with selected graduations thereof which will correspond to a reading taken of the meter, a receiving stall adjacent to the other end of said support for locating the card in a predetermined position on said support, said support having openings entering into said stall corresponding to the said graduations, and means actuated by adjustment of the pointer means for selectively illuminating those openings only which correspond to said graduations on each scale means with which the pointer means thereof are aligned so as to provide brightened spots on a card located in said stall which will serve as a guide for position marking the meter reading on said card.

2. A device of the character described comprising a support for a card on which a meter reading or the like is to be recorded by position marking, said support having scale means adjacent one end thereof provided with graduations to correspond to those on a meter to be read, pointer means for said scale means adjustably mounted on said support so as to be aligned with selected graduations thereof which will correspond to a reading taken of the meter, a receiving stall adjacent the other end of said support for locating the card in a predetermined position on said support, said support having openings entering into said stall corresponding to the said graduations, and means actuated by adjustment of the pointer means for selectively illuminating those openings only which correspond to said graduations with which the pointer means are aligned so as to provide brightened spots on a card located in said stall which will serve as a guide for position marking the meter reading on said card, said device further having additional signal means which are operatively associated with said pointer means so as to be energized by adjustment of said pointer means into alignment with selected graduations at one end of their associated scale means.

3. A device used in the reading of a utilities meter comprising a hand-portable illuminating member having means which may be energized and used to direct light onto a utilities meter to be read, said member comprising a support for a card on which the meter reading may be recorded, said member having a plurality of scale means mounted thereon adjacent the meter directing end thereof, said scale means each having graduations to correspond to those on said meter to be read, pointer means for said scale means adjustably mounted on said member so as to be aligned with selected graduations on said scale means which will correspond to a reading taken of the meter, said member including a face panel which overlies a space on which a meter reading card is intended to be located on said member, said face panel having openings therein through which aligned portions of a card located in said space therebeneath may be marked, said openings being arranged to correspond to the graduations of said scale means, said member further having means for directing light out through said openings from interior of the device, and means actuated by adjustment of the pointer means for selectively controlling said direction of light out through said openings whereby only those portions of a supported card will be lighted which are aligned with an opening corresponding to a graduation of each of the scale means with which the reader aligns the pointer means, the openings thus lighted serving to indicate to the reader those portions of the card which he should mark to correctly record his reading of the meter.

4. A device of the character described comprising a member having a plurality of scales each provided with graduations to correspond to those on a plural scale meter to be read, pointer means for each scale adjustably mounted on said member so as to be aligned with selected graduations on said scales which will correspond to a reading taken of the plural scale meter, a receiving slot into which a card may be located so as to lie beneath in adjacent parallel relation to a face of said member, said face having openings therein through which aligned portions of a card located in said slot may be marked, said openings being arranged in groups corresponding to the said scales and graduations thereof, and means actuated by adjustment of the pointer means for selectively indicating the openings which correspond to the graduations of each of the scales with which the pointer means are aligned, the indicated openings serving to guide the reader as to those portions of the card he should mark to correctly record has reading of the meter.

5. A device of the character described comprising an illuminating member having means at one end which may be energized for directing light onto a meter to be read, said illuminating member having a plurality of scales mounted thereon each provided with graduations to coerspond to those on said meter, pointer means for each scale adjustably mounted on said member so as to be aligned with a selected graduation on each said scales which will correspond to a reading taken of the meter, a receiving slot into which a card may be located so as to lie beneath in adjacent parallel relation to a face of said member, said face having openings therein through which aligned portions of a card located in said slot may be marked, said openings being arranged in groups corresponding to the said scales and graduations thereof, and means actuated by adjustment of the pointer means for selectively illuminating those openings only which correspond to the graduations of the scales with which the pointer means are selectively aligned so as to indicate to the reader the portions on the card which he should mark to correctly record his reading of the meter.

6. A device for use in recording a meter reading on a card comprising a member having a plurality of scales provided adjacent one end with graduations to correspond to those on said meter, pointer means for each scale adjustably mounted on said member so as to be aligned with selected graduations on said scales which will correspond to a reading taken of the meter, a receiving slot into which a card may be located so as to lie beneath in adjacent parallel relation to a face of said member, said face having openings therein through which aligned portions of a card located in said slot may be marked, said openings being arranged in groups corresponding to the said scales and graduations thereof, illuminating means within said member for directing light out of said openings, and means actuated by adjustment of the pointer means for selectively controlling illumination of said openings whereby only those aligned portions of a card in the slot will be lighted which are aligned with openings corresponding to the graduations of each said scales with which the pointer means are aligned, the openings thus lighted indicating to the reader the portions of the card which should be marked to correctly record his reading of a meter.

7. A device of the character described comprising a support for a card on which a meter reading is to be recorded by position marking, said support containing energizable illuminating means, means by which light therefrom may be directed onto a meter to be read, a plurality of scales on said support having graduations which correspond to those on said meter, pointer means for said scales which may be adjusted so as to be aligned with selected graduations on said scales which will correspond to a reading taken of the meter, a receiving stall on said support into which a card may be located in a predetermined position, a guide panel over said receiving stall having openings therein through which aligned portions of a card when located in said stall may be marked, said openings being arranged to correspond to the graduations of said scales, said support further having means for directing light through said card out of said openings, and means actuated by adjustment of the pointer means for selectively controlling the directing of light through said openings so that only those aligned portions of a card in the stall will be lighted which are aligned with the openings corresponding to the graduations of the scales with which the pointer means are aligned whereby those openings which are illuminated will indicate to the reader those portions of the card which should be marked to correctly record his reading of a meter.

8. A device for use in recording a meter reading on a card comprising a member having a plurality of scales provided adjacent one end with graduations to correspond to those on said meter, pointer means for each scale adjustably mounted on said member so as to be aligned with selected graduations on said scales which will correspond to a reading taken of the meter, a receiving slot into which a card may be located so as to lie beneath in adjacent parallel relation to a face of said member, said face having openings therein through which aligned portions of a card located in said slot may be marked, said openings being arranged in groups corresponding to the said scales and graduations thereof, a plurality of lamps supported within said member one beneath each of said openings, baffle means by which light from said lamps can exit only through the respective opening with which it is aligned, circuits connecting each of said lamps with a source of electrical energy, control switches in said circuits positioned for selected actuation by adjustment of the pointer means, whereby only those lamps will be lighted which are aligned with the openings corresponding to the graduations of the scales with which the pointer means are aligned, the openings thus lighted serving as a giude to indicate to the reader those portions of the card which should be marked to correctly record his reading of the meter.

9. A device for use in recording a meter reading on a card comprising a member having a plurality of scales provided adjacent one end with graduations to correspond to those on said meter, pointer means for each scale adjustably mounted on said member so as to be aligned with selected graduations on said scales which will correspond to a reading taken of the meter, signal means in the form of a lamp, a circuit for said lamp connecting it with a source of electrical energy and a control switch in said circuit which is operatively connected with one of the pointer means to close said circuit to cause energization of said lamp when the pointer means is aligned with a limited member of graduations at one end of the associated scale, said lamp when energized serving to warn the reader that the scale is being read in said end, said member having a receiving slot into which a card may be located so as to lie beneath in adjacent parallel relation to a face of said member, said face having openings therein through which aligned portions of a card located in said slot may be marked, said openings being arranged in groups corresponding to the said scales and graduations thereof, a plurality of additional lamps supported within said member one beneath each of said openings, baffle means by which light from said additional lamps can exit only through the respective opening with which it is aligned, other circuits connecting each of said additional lamps with a source of electrical energy, further control switches in said other circuits positioned for selected actuation by adjustment of the pointer means, whereby only those additional lamps will be lighted which are aligned with the openings corresponding to the graduations of the scales with which the pointer means are aligned, the openings thus lighted serving as a guide to indicate to the reader those portions of the card which should be marked to correctly record his reading of the meter.

10. A device for use in recording a meter reading on a card comprising a member having four scales provided adjacent one end with graduations to correspond to those on said meter, one of said scales representing units, a second representing tens, a third representing hundreds, and a fourth representing thousands, pointer means for each scale adjustably mounted on said member so as to be aligned with selected graduations on each said scales which will correspond to a reading taken of the meter, signal lamps mounted on said member and operatively associated with the pointer means of at least the units, tens and hundreds scales so as to be energized by adjustment of said pointer means into alignment with the highest graduation only on their associated scale, a receiving slot into which a card may be located so as to lie beneath in adjacent parallel relation to a face of said member, said face having openings therein through which aligned portions of a card located in said slot may be marked, said openings being arranged in groups corresponding to the said scales and graduations thereof, a plurality of lamps supported within said member one beneath each of said openings, baffle means by which light from said lamp can exit only through the respective opening with which it is aligned, circuits connecting each of said lamps with a source of electrical energy, control switches in said circuits positioned for selected actuation by adjustment of the pointer means, whereby only those lamps will be lighted which are aligned with the openings corresponding to the graduations of the scales with which the pointer means are aligned, the openings thus lighted serving as a guide to indicate to the reader those portions of the card which should be marked to correctly record his reading of the meter.

11. For use in reading a meter constituting a plurality of scales each having an X number of graduations and an associated indicator wherein the operating mechanism of each said scales and their associated indicators are drivingly connected in series whereby as the indicator of one scale is moved relative to the graduations thereof, the indicator on the next succeeding meter scale in the series is moved 1/X of a graduation so that the position of the indicator on each succeeding scale in the series is measured X times that measured by the position of the indicator of the preceding meter scale, a recording device which comprises a support, a plurality of scales mounted thereon and each graduated in an X number of graduations, the number of scales mounted on said device being at least as many as the number of scales on the meter to be read, said scales each further having an associated pointer, and said scales and pointers being adapted for adjustment manually one relative to the other to locate each pointer at a graduation on its associated scale which corresponds to the position of the indicator on the corresponding scale of the meter being read, said device further having energizable signal means, and means actuated by said pointers for energizing said signal means operably connected with said adjustably related scales and pointers, such that, only when a pointer is located at a graduation in the higher end fraction of its associated scale, will it energize the signal means, said energizing of the signal means serving to warn the recorder that as he reads the meter the indicator on the next succeeding scale should be read as indicating the next lower graduation to which it is closest.

References Cited in the file of this patent

UNITED STATES PATENTS

| | | |
|---|---|---|
| 440,839 | Coffin | Nov. 18, 1890 |
| 1,728,997 | Johnson | Sept. 24, 1929 |
| 1,912,263 | Sonno | May 30, 1933 |
| 2,474,914 | Purvis | July 5, 1949 |
| 2,676,087 | Wales | Apr. 20, 1954 |
| 2,791,850 | Noble | May 14, 1957 |